United States Patent [19]
Hackett

[11] Patent Number: 6,092,495
[45] Date of Patent: Jul. 25, 2000

[54] METHOD OF CONTROLLING ELECTRONICALLY CONTROLLED VALVES TO PREVENT INTERFERENCE BETWEEN THE VALVES AND A PISTON

[75] Inventor: David E. Hackett, Washington, Ill.

[73] Assignee: Caterpillar Inc., Peoria, Ill.

[21] Appl. No.: 09/146,607

[22] Filed: Sep. 3, 1998

[51] Int. Cl.$^7$ .................................................. F01L 1/00
[52] U.S. Cl. .................................. 123/90.15; 123/90.12; 123/198 D
[58] Field of Search ...................... 123/90.1, 90.11, 123/90.12, 90.15, 90.16, 90.17, 198 D

[56] References Cited

U.S. PATENT DOCUMENTS

| | | | |
|---|---|---|---|
| 3,830,207 | 8/1974 | Joseph | 123/32 EA |
| 3,935,846 | 2/1976 | Zelenka | 123/117 R |
| 4,469,065 | 9/1984 | Hasegawa et al. | 123/359 |
| 4,621,600 | 11/1986 | Hasegawa et al. | 123/357 |
| 4,636,957 | 1/1987 | Otobe et al. | 364/431.07 |
| 4,643,152 | 2/1987 | Yamato | 123/480 |
| 5,074,259 | 12/1991 | Pusic | 123/90.11 |
| 5,339,777 | 8/1994 | Cannon | 123/90.12 |
| 5,417,190 | 5/1995 | Ando et al. | 123/308 |
| 5,596,956 | 1/1997 | Ogawa et al. | 123/90.11 |
| 5,598,814 | 2/1997 | Schroeder et al. | 123/90.11 |
| 5,636,601 | 6/1997 | Moriya et al. | 123/90.11 |

*Primary Examiner*—Weilun Lo
*Attorney, Agent, or Firm*—Maginot, Addison & Moore

[57] ABSTRACT

The method includes the steps of sensing position of the crankshaft during a number of engine cycles and generating a frequency signal in response thereto and sensing position of the crankshaft during a number of engine cycles and generating a crankshaft frequency signal in response thereto and calculating a crankshaft speed and a crankshaft acceleration based on the frequency signal. The method further includes the step of and calculating a future piston position based on the crankshaft speed and the crankshaft acceleration. The method still further includes the steps of calculating a future engine valve position and comparing the future piston position to the future engine valve position to determine if the future engine valve position interferes with the future piston position. The method yet further includes the step of locating the engine valve in the closed position in response to determining that the future engine valve position interferes with the future piston position. An engine assembly is also disclosed.

20 Claims, 2 Drawing Sheets

METHOD OF CONTROLLING ELECTRONICALLY CONTROLLED VALVES TO PREVENT INTERFERENCE BETWEEN THE VALVES AND A PISTON

TECHNICAL FIELD OF THE INVENTION

The present invention relates generally to a method of operating an engine, and more specifically to a method of controlling electronically controlled valves to prevent interference between the valves and a piston.

BACKGROUND OF THE INVENTION

The intake and exhaust valves of most engines are actuated by a mechanical linkage operatively coupled to a camshaft of the engine. The camshaft is mechanically coupled to a crankshaft of the engine by either gears or belts. The crankshaft is further coupled to a piston which allows the motion of the valves to be synchronized with the motion of the piston. A disadvantage of this type of valve actuation is that timing and duration of valve events, i.e. the opening and closing of the valves, is fixed relative to the position of the piston and cannot be adjusted for varying engine operating conditions.

One method to vary the timing and duration of valve events is to actuate the valves with an actuator which operates independently of the camshaft. These actuators open and close the valves in response to an electronic control signal generated by an engine controller. These actuators can either be electrical actuators which utilize electrical power to open the valve or hydro-electrical actuators which utilizes an electrical solenoid to control the flow of pressurized fluid used to open the valve. A spring then returns the valve to the closed position when the electronic control signal is not recieved. Both actuators allow the intake valve or exhaust valve to be opened at any time during the stroke of the piston in response to the receipt of the control signal. Thus, timing and duration of valve events may be varied by altering the electronic control signal. By varying the timing and duration of the valve events, performance and emissions can be better optimized for different engine operating conditions.

However, a drawback to actuating the valves with this type of actuator is that the valves can be placed in an open position when the piston is near its uppermost position. If the intake or exhaust valve is positioned in the open position when the piston is in the uppermost position, the valve will interfere, or come into contact with, the piston. When the valve interferes with the piston, the resulting collision usually damages the valve and actuator. Valve interference is generally not a problem with camshaft actuated valves. Camshaft actuated valves are mechanically configured such that the intake and exhaust valves are positioned in the closed position when the piston is in its uppermost position thereby making it impossible for the valves to interfere with the piston.

What is needed therefore is a method and apparatus which prevents interference between the piston and the valves in an engine using electronically controlled valve actuators.

DISCLOSURE OF THE INVENTION

In accordance with a first embodiment of the present invention, there is provided a method of operating an engine. The engine includes an engine block with a piston cylinder defined therein, an engine head secured to the engine block, and a piston which translates within the piston cylinder. The engine block, the engine head, and the piston cooperate to define a combustion chamber. The engine further includes a crankshaft mechanically coupled to the piston, (v) a conduit in fluid communication with the combustion chamber, and (vi) an engine valve which is movable between an open position which places the combustion chamber in fluid communication with the conduit and a closed position which isolates the combustion chamber from fluid communication with the conduit. The method includes the steps of sensing position of the crankshaft during a number of engine cycles and generating a crankshaft frequency signal in response thereto and calculating a crankshaft speed and a crankshaft acceleration based on the frequency signal. The method further includes the step of and calculating a future piston position based on the crankshaft speed and the crankshaft acceleration. The method still further includes the steps of calculating a future engine valve position and comparing the future piston position to the future engine valve position to determine if the future engine valve position interferes with the future piston position. The method yet further includes the step of locating the engine valve in the closed position in response to determining that the future engine valve position interferes with the future piston position.

In accordance with a second embodiment of the present invention, there is provided an engine assembly. The engine assembly includes an engine block having a piston cylinder defined therein, an engine head secured to the engine block, and a piston which translates within the piston cylinder. The engine block, the engine head, and the piston cooperate to define a combustion chamber. The engine assembly further includes a crankshaft mechanically coupled to the piston, a conduit in fluid communication with the combustion chamber, and an engine valve which is movable between an open position which places the combustion chamber in fluid communication with the conduit and a closed position which isolates the combustion chamber from fluid communication with the conduit. The engine assembly still further includes a crankshaft sensor for sensing position of the crankshaft and generating a crankshaft frequency signal in response thereto. The engine assembly yet further includes an engine control unit which is operable to (i) calculate a crankshaft speed and a crankshaft acceleration based on said frequency signal (ii) calculate a future piston position based on the crankshaft speed and the crankshaft acceleration, (iii) calculate a future engine valve position, (iv) compare the future piston position to the future engine valve position to determine if the future valve position interferes with the future piston position, and (v) cause the engine valve to be located in the closed position in response to determining that the future engine valve position interferes with the future piston position.

In accordance with a third embodiment of the present invention, there is provided a method of operating an engine. The engine includes a crankshaft, a piston, an engine valve, a combustion chamber, and a conduit. The engine valve is movable between an open position and a closed position. The engine valve allows fluid communication between the combustion chamber and the conduit when the engine valve is positioned in the open position. The engine valve prevents fluid communication between the combustion chamber and the conduit when the engine valve is positioned in the closed position. The method includes the steps of calculating a future piston position of the piston and calculating a future engine valve position of the engine valve. The method further includes the step of comparing the future piston position to the future engine valve position to determine if the future engine valve position interferes with the future piston position. The method yet further includes the step of moving the engine valve toward the closed position in response to determining that the future engine valve position interferes with the future piston position.

BEST MODE FOR CARRYING OUT THE INVENTION

Figure 1:
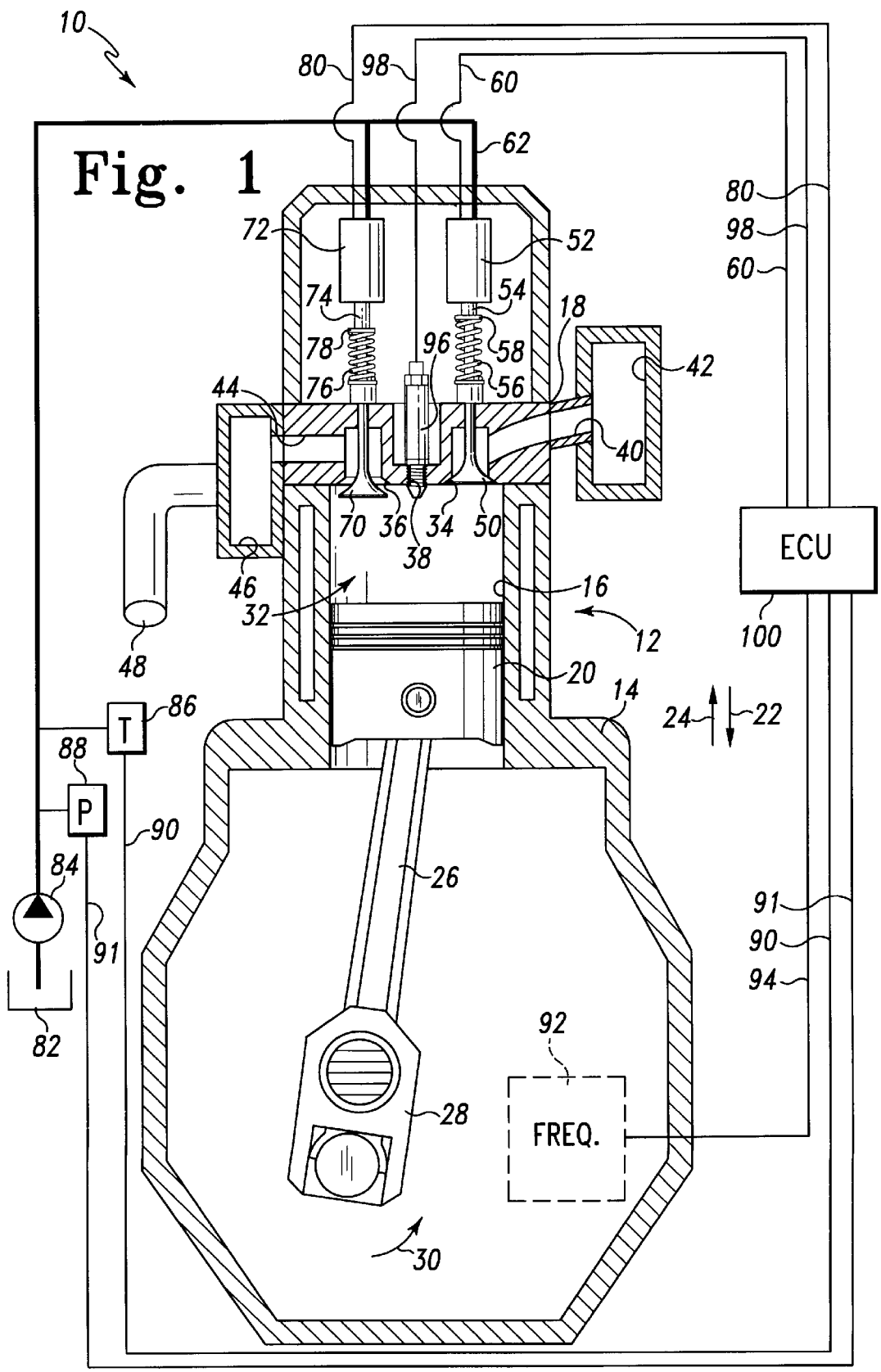
FIG. 1 is a partial cross sectional, partial schematic view of an engine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a diesel engine or engine assembly 10. The engine assembly 10 includes a cylinder assembly 12. The cylinder assembly 12 includes an engine block 14 having a piston cylinder 16 defined therein. An engine head 18 is secured to an upper portion of the engine block 14. The cylinder assembly 12 further includes a piston 20 which translates in the piston cylinder 16 in the general direction of arrows 22 and 24. As the piston 20 moves downwardly in the general direction of arrow 22 to the position shown in FIG. 1, a connecting rod 26 secured to the piston 20 urges a crankshaft 28 to rotate in the general direction of arrow 30. Subsequently, as the crankshaft 28 continues to rotate in the general direction of arrow 30, the crankshaft 28 urges the connecting rod 26 and the piston 20 in the general direction of arrow 24 to return the piston 20 to an uppermost position (not shown).

Figure 2:
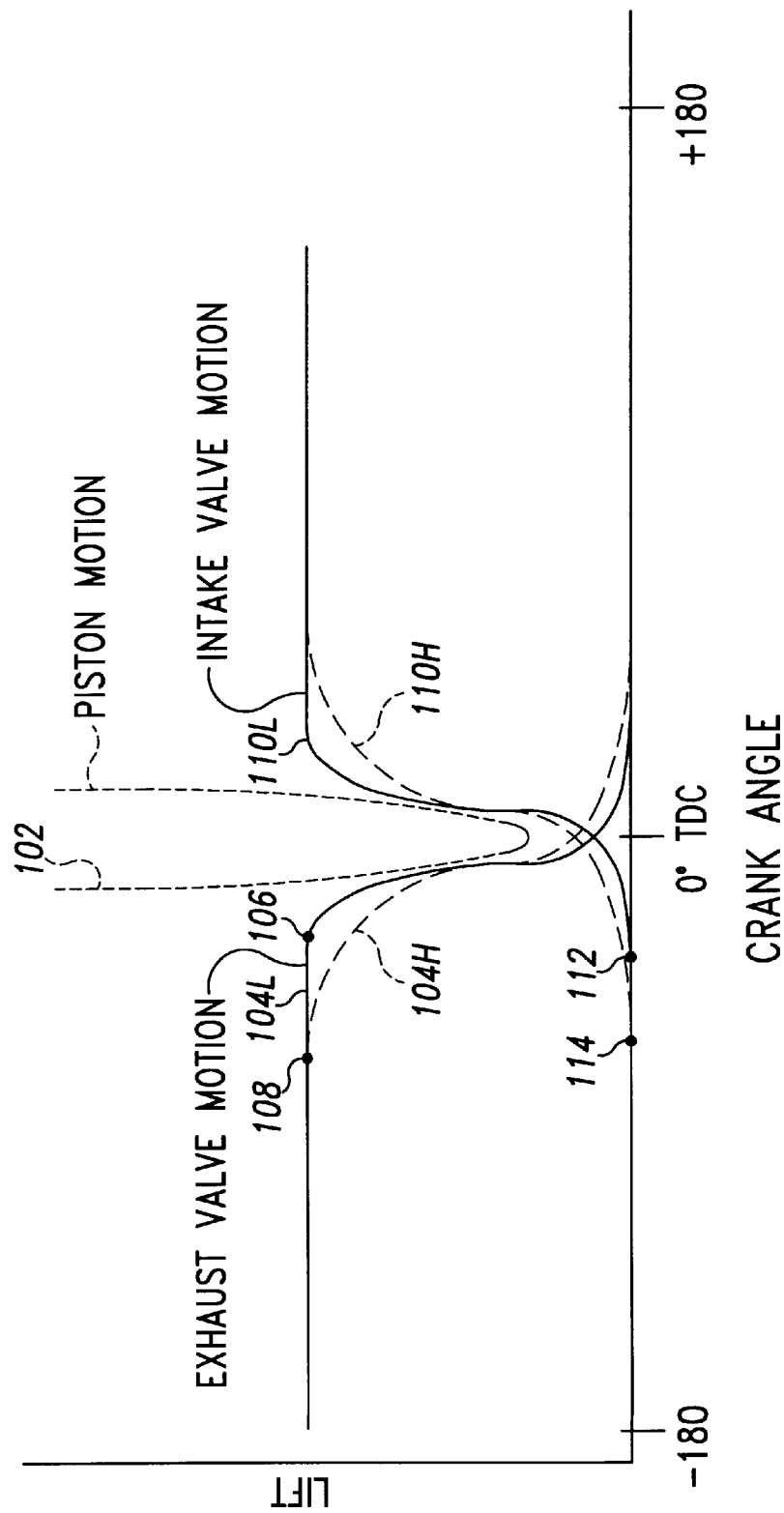
FIG. 2 is a graph showing the position of the exhaust valve and intake valve relative to the position of the piston from the end of an exhaust stroke to the beginning of an intake stroke.

The piston 20, the piston cylinder 16, and the engine head 18 cooperate so as to define a combustion chamber 32. In particular, when the piston 20 is advanced in the general direction of arrow 24, the volume of the combustion chamber 32 is decreased. On the other hand, when the piston 20 is advanced in the general direction of arrow 22, the volume of the combustion chamber 32 is increased as shown in FIGS. 1 and 2.

The engine head 18 has an intake port 34, an exhaust port 36, and a fuel injector opening 38 defined therein. Each of the intake port 34, exhaust port 36, and fuel injector opening 38 are in fluid communication with the combustion chamber 32.

An intake conduit 40 places the intake port 34 in fluid communication with an intake manifold 42. Air is advanced into the intake manifold 42 from an engine air inlet (not shown) prior to being advanced to the intake conduit 40. Similarly, an exhaust conduit 44 places the exhaust port 36 in fluid communication with an exhaust manifold 46. An exhaust outlet 48 in fluid communication with the exhaust manifold 46 allows exhaust gases to advance from the exhaust manifold 46 to a turbocharger (not shown) prior to advancing to the atmosphere.

An intake valve 50 selectively places the intake manifold 42 in fluid communication with the combustion chamber 32. When the intake valve 50 is placed in the open position (not shown), air is advanced from the intake manifold 42 to the combustion chamber 32 via the intake port 34 and the intake conduit 40. It should be appreciated that when the intake valve 50 is in the open position, the piston 20 can strike the intake valve 50 when the piston 20 is in its uppermost position (not shown). When the intake valve 50 is placed in the closed position (shown in FIG. 1), air is prevented from advancing from the intake manifold 42 to the combustion chamber 32 since the intake valve 50 blocks fluid flow through the intake port 34. In addition, an intake valve spring 56 is interposed between the engine head 18 and a cap 58 on the upper end of the intake valve 50. The intake valve spring 56 applies a bias force to the cap 58 which urges the intake valve 50 in the general direction of arrow 24 so as to place the intake valve 50 in the closed position.

The intake valve 50 is actuated by an electro-hydraulic valve actuator 52. It should be appreciated that numerous types of electro-hydraulic actuators may be used as the actuator 52 in the present invention. Potential actuators include, but are not limited to, electric, magnetic, pneumatic, and hydraulic actuators. One such actuator that is particularly useful as the electro-hydraulic actuator 52 of the present invention is disclosed in U.S. Pat. No. 5,339,777 issued to Cannon, which is hereby incorporated by reference, and which is assigned to the same assignee as the present invention. The electro-hydraulic intake valve actuator 52 includes a rod 54 which is movable in the general direction of arrows 22 and 24. In particular, when the electro-hydraulic intake valve actuator 52 receives an intake valve control signal via the signal line 60, an internal solenoid (not shown) allows hydraulic pressure from the line 62 to be applied to the rod 54 which causes the rod 54 to advance in the general direction of arrow 22. As the rod advances in the general direction of arrow 22, the force of the rod 54 acting on the cap 58 overcomes the spring bias force of the intake spring 56 thereby allowing the rod 54 to move the intake valve 50 in the general direction of arrow 22. As the rod moves in the general direction of arrow 22, the intake valve is moved from the closed position (shown in FIG. 1) to the open position (not shown) so as to allow fluid communication between the combustion chamber 32 and the intake manifold 42.

Similarly, when the electro-hydraulic intake valve actuator 52 ceases to receive the intake valve control signal via the signal line 60, the internal solenoid removes the hydraulic pressure from the line 62 on the rod 54. As the hydraulic pressure is removed from the rod 54, the spring bias force of the intake valve spring 56 urges the cap 58 and rod 54 in the general direction of arrow 24. As the rod 54 moves in the general direction of arrow 24, the intake valve 50 is moved from the open position to the closed position so as to isolate the combustion chamber 32 and the intake conduit 40.

An exhaust valve 70 selectively places the exhaust manifold 46 in fluid communication with the combustion chamber 32. When the exhaust valve 70 is placed in the open position (shown in FIG. 1), gases are advanced from the combustion chamber 32 to the exhaust manifold 46 via the exhaust port 36 and the exhaust conduit 44. It should be appreciated that when the exhaust valve 70 is in the open position, the piston 20 can strike the exhaust valve 70 when the piston 20 is positioned in its uppermost position (not shown). When the exhaust valve 70 is placed in the closed position (not shown), exhaust gases are prevented from advancing from the combustion chamber 32 to the exhaust manifold 46 since the exhaust valve 70 blocks fluid flow through the exhaust port 36. In addition, an exhaust valve spring 76 is interposed between the engine head 18 and a cap 78 on the upper end of the exhaust valve 70. The exhaust valve spring 76 applies a bias force to the cap 78 which urges the exhaust valve 70 in the general direction of arrow 24 so as to place the exhaust valve 70 in the closed position.

The exhaust valve 70 is actuated by an electro-hydraulic exhaust valve actuator 72 similar to the intake valve actuator 52. The electro-hydraulic exhaust valve actuator 72 includes a rod 74 which is movable in the general direction of arrows 22 and 24. In particular, when the electro-hydraulic exhaust valve actuator 72 receives an exhaust valve control signal via the signal line 80, an internal solenoid (not shown) allows hydraulic pressure from the line 62 to be applied to the rod 74 which causes the rod 74 to advance in the general direction of arrow 22. As the rod advances in the general direction of arrow 22, the force of the rod 74 acting on the cap 78 overcomes the spring bias force of the exhaust spring 76 thereby allowing the rod 74 to move the exhaust valve 70 in the general direction of arrow 22. As the rod 74 moves in the general direction of arrow 22, the exhaust valve is moved from the closed position (not shown) to the open position (shown in FIG. 1) so as to allow fluid communication between the combustion chamber 32 and the exhaust manifold 46.

Similarly, when the electro-hydraulic exhaust valve actuator 72 ceases to receive the exhaust valve control signal via the signal line 80, the internal solenoid removes the hydraulic pressure from the line 62 on the rod 74. As the hydraulic pressure is removed from the rod 74, the spring bias force of the exhaust valve spring 76 urges the cap 78 and rod 74 in the general direction of arrow 24. As the rod 74 moves in the general direction of arrow 24, the exhaust valve 70 is moved from the open position (shown in FIG. 1) to the closed position (not shown) so as to isolate the combustion chamber 32 and the exhaust conduit 44.

The engine assembly 10 further includes a hydraulic fluid reservoir 82 and a hydraulic pump 84. The hydraulic pump 84 draws low pressure hydraulic fluid from the hydraulic fluid reservoir 82 and advances high pressure hydraulic fluid to the electro-hydraulic actuators 52 and 72 via the hydraulic line 62. It should be appreciated that the hydraulic fluid pump 84 provides the high pressure hydraulic fluid which is used to urge the intake valve 50 and the exhaust valve 70 from their respective closed position to their respective open position. It should further be appreciated the hydraulic fluid reservoir 82 may be the same reservoir used to store lubricating oil for the crankshaft 28, piston 20 and other components of the engine assembly 10.

The engine assembly 10 further includes a temperature sensor 86. The temperature sensor 86 is in fluid communication with the hydraulic line 62. The temperature sensor 86 is operable to measure temperature associated with the hydraulic fluid in the line 62 and generate temperature signals on the signal line 90 in response thereto. In particular, during cold operating conditions and start up conditions, as the temperature of the hydraulic fluid decreases, the viscosity of the hydraulic fluid increases thereby decreasing the speed at which the actuator 52 and actuator 72 can move the respective intake valve 50 or exhaust valve 70. On the other hand, as the temperature of the hydraulic fluid increases, the viscosity of the hydraulic fluid decreases thereby increasing the speed at which the actuator 52 and actuator 72 can move the respective intake valve 50 or exhaust valve 70.

The engine assembly 10 further includes a pressure sensor 88. The pressure sensor 88 is in fluid communication with the hydraulic line 62. The pressure sensor 86 is operable to measure pressure associated with the hydraulic fluid in the line 62 and generate pressure signals on the signal line 91 in response thereto. In particular, the pressure of the hydraulic fluid may drop as the load on the hydraulic pump 84 increases. Ideally, the pressure of the hydraulic fluid in the hydraulic line 60 would remain constant. However, as the pressure of the hydraulic fluid decreases, the speed at which the actuator 52 and actuator 72 can move the respective intake valve 50 or exhaust valve 70 decreases. On the other hand, as the pressure of the hydraulic fluid increases, the speed at which the actuator 52 and actuator 72 can move the respective intake valve 50 or exhaust valve 70 increases.

The engine assembly 10 further includes a fuel injector 96 positioned within the fuel injector opening 38. The fuel injector 96 is operable to receive fuel injector control signals via the signal line 98 and advance a quantity of fuel into the combustion chamber 32 in response thereto.

The engine assembly 10 further includes a crankshaft position sensor 92 which measures the instantaneous position of the crankshaft 28. The crankshaft sensor 92 generates a frequency signal on the signal line 94 in response to measuring the instantaneous position of the crankshaft 28 over the number of engine cycles. The frequency signal provides the information necessary to time the opening and closing of the intake valve 50, opening and closing of the exhaust valve 70, and injection of fuel into the combustion chamber 32 with respect to the position of the piston 20.

The engine assembly 10 further includes an engine control unit 100. The engine control unit 100 is operable to calculate a crankshaft position, a crankshaft speed and a crankshaft acceleration based on the frequency signal recieved via the signal line 94 over the number of engine cycles. The engine control unit 100 is further operable to receive temperature signals from the temperature sensor 86 via the signal line 90 and pressure signals from the pressure sensor 88 via the signal line 91.

The engine control unit 100 is yet further operable to generate intake valve control signals and exhaust valve control signals in response to calculating the crankshaft speed and the crankshaft acceleration and receiving the hydraulic temperature signals and the hydraulic pressure signals. The intake valve control signals are sent to the intake valve actuator 52 via the signal line 60 so as to cause the intake valve actuator 52 to position the intake valve 50. The exhaust valve control signals are sent to the exhaust valve actuator 72 via the signal line 80 so as to cause the exhaust valve actuator 72 to position the exhaust valve 70.

Because of the known kinematic relationship between the crankshaft 28 and the piston 20, the engine control unit 100 is able to calculate a future position of the piston 20 based on the crankshaft speed and crankshaft acceleration. In particular, the engine control unit 100 calculates the future position of the crankshaft 28, and then calculates the position of the piston 20 that corresponds to the position of the crankshaft 28.

In addition, the temperature signal and the pressure signal are used to calculate the future position of the of the intake valve 50 and the exhaust valve 70. In particular, the intake valve control signal is used to determine the current position of the intake valve 50 and the pressure signal and temperature signal are used to calculate the speed at which the intake valve 50 can be moved from its current position to the open position or the closed position. With the position and speed of the intake valve 50, a future position of the intake valve 50 can be calculated. Similarly, the exhaust valve control signal is used to determine the current position of the exhaust valve 70 and the pressure signal and temperature signal are used to calculate the speed at which the exhaust valve 70 can be moved from its current position to the open position or the closed position. With the position and speed of the exhaust valve 70, a future position of the exhaust valve 70 can be calculated.

The future position of the intake valve 50 and the future position of the exhaust valve 70 can then be compared to the future position of the piston 20 to determine if interference between either the intake valve 50 or the exhaust valve 70 and the piston 20 is eminent. What is meant herein as an "interference" is that the either the intake valve 50 or the exhaust valve 70 will come into contact with the piston 20 if no change is made in the position of the intake valve 50 or the exhaust valve 70. It should be appreciated that the calculations are made at a time sufficiently advanced prior to the interference to allow some action to be taken before the intake valve 50 or exhaust valve 70 comes into contact with the piston 20.

The engine control unit 100 is further operable to generate fuel injector control signals which are sent to the fuel injector 96 via the signal line 98 in response to receiving the temperature signal and crank angle position signal. The injector control signals control the timing and quantity of fuel injected by the fuel injector 96 into the combustion chamber 32.

Industrial Applicability

In operation, the engine assembly 10 operates in a four stroke cycle which includes an intake stroke, a compression stroke, a power stroke, and an exhaust stroke. It should be appreciated that the engine control unit 100 determines when each of the respective strokes begins and ends from the crankshaft position, the crankshaft speed, and crankshaft acceleration calculated from the crankshaft frequency signal received via the signal line 94.

The first stroke is the intake stroke, during which the exhaust valve 70 is positioned in the closed position (not shown) by the spring bias of the exhaust valve spring 76. The engine control unit 100 generates an intake valve control signal which is sent to the intake valve actuator 52 causing the intake valve 50 to be positioned in the open position (not shown). The spring bias of the exhaust spring 76 urges the exhaust valve into the closed position. During the intake stroke, the piston 20 is advanced downwardly in the general direction of arrow 22 thereby creating a low pressure in the combustion chamber 32. This low pressure draws air from the intake conduit 40 downwardly into the combustion chamber 32.

Advancing to the compression stroke, the intake valve 50 and the exhaust valve 70 are both positioned in their respective closed positions by the respective springs 56 and 76. As the piston 20 moves upwardly in the general direction of arrow 24, it compresses the air in the combustion chamber 32. The compression of the air in the combustion chamber 32 greatly increases the temperature of the air in the combustion chamber 32. Near the end of the compression stroke, the engine control unit 100 generates a fuel injector control signal on the signal line 98 which causes the fuel injector 96 to inject fuel into the combustion chamber 32. The injection of the fuel into the heated air present in the combustion chamber 32 ignites the fuel.

The combustion of the fuel and air in the combustion chamber 32 advances the engine assembly 10 to the power stroke in which the intake valve 50 and the exhaust valve 70 are both positioned in their respective closed positions by the spring bias force of the respective springs 56 and 76. As the fuel and air are combusted, exhaust gases are formed. The formation of exhaust gases generates heat and pressure which acts upon the piston 20 to drive the piston 20 in the general direction of arrow 22. Movement of the piston 20 in the general direction of arrow 22 causes the crankshaft 28 to rotate in the general direction of arrow 30.

Thereafter, the engine assembly 10 is advanced to an exhaust stroke. The engine control unit 100 generates an exhaust valve control signal which causes exhaust valve actuator 72 to position the exhaust valve 70 in the open position. The intake valve spring 56 to position the intake valve 50 in the closed position. As the piston is advanced from the position shown in FIG. 1 in the general direction of arrow 24, the piston forces exhaust gases past the open exhaust valve 70 and into the exhaust conduit 44. The engine the advances to another intake stroke to start another cycle of the engine.

It should be appreciated that the piston 20 is positioned at the uppermost portion of the piston cylinder 16 at two periods during the engine cycle. These two potential interference periods are the only periods during the engine cycle where either the intake valve 50 or the exhaust valve 70 can interfere with the piston 20. The first potential interference period occurs near the end of the exhaust stroke and the beginning of the intake stroke. The second potential interference period occurs near the end of the compression stroke and the beginning of the power stroke.

Referring to FIG. 2, there is shown the relative position of the piston 20, intake valve 50, and exhaust valve 70 during the first potential interference period. Interference between the exhaust valve 70 and the piston 20 is most likely to occur during this period because the exhaust valve 70 is open just prior to the piston 20 approaching its uppermost position in the piston cylinder 16.

It should be appreciated that the engine control unit 100 calculates the position of the piston 20 based on the crankshaft position, the crankshaft speed and the crankshaft acceleration. It should further be appreciated that the engine control unit 100 calculates the position and speed of the exhaust valve 70 based on the exhaust valve control signal, temperature signal, and pressure signal.

The line 102 represents the calculated position of the piston 20 relative to the position of the crankshaft 28. The line 104L represents the calculated position of the exhaust valve 70 necessary to avoid interference with the piston 20 when the engine is operating at an exemplary low speed whereas the line 104H represents the calculated position of the exhaust valve 70 necessary to avoid interference with the piston 20 when the engine is operating at an exemplary high speed.

It should be appreciated that to avoid interference between the exhaust valve 70 and the piston 20 at the low speed, the exhaust valve actuator 72 must start to close the exhaust valve 70 prior to the exhaust valve 70 reaching a point 106. The exhaust valve 70 may be closed later at lower speeds because there is more time to move the exhaust valve 70 toward the closed position to prevent interference between the exhaust valve 70 and the piston 20. On the other hand, to avoid interference between the exhaust valve 70 and the piston 20 at the high speed, the exhaust valve actuator 72 must start to move the exhaust valve 70 toward the closed position prior the exhaust valve 70 reaching a point 108. The exhaust valve 70 must be closed earlier at the high speed because there is less time to move the exhaust valve 70 toward the closed position to prevent interference between the exhaust valve 70 and the piston 20. Therefore, the future piston position of the piston 20, and the future valve position of the exhaust valve 70 must be calculated prior to the exhaust valve 70 reaching the point 106 at the low speed and prior to the exhaust valve 70 reaching the point 108 at the high speed.

The engine control unit 100 then compares the future valve position of the exhaust valve 70 to the future piston position of the piston 20 to determine if the future valve position interferes with the future piston position. In particular, at the low speed, the engine control unit 100 calculates when the exhaust valve control signal will be sent to the exhaust valve actuator 72 to move the exhaust valve 70 toward the closed position prior to the exhaust valve 70 reaching the point 106. If the exhaust valve control signal which closes the exhaust valve 70 is not scheduled to be sent to the exhaust valve actuator 72 prior the exhaust valve 70 reaching to point 106, the engine control unit 100 determines that the future valve position of the exhaust valve 70 interferes with the future piston position of the piston 20. The engine control unit 100 sends an override exhaust valve control signal via the signal line 80 which causes the exhaust valve actuator 72 to move the exhaust valve 70 toward the closed position thereby preventing the interference between the exhaust valve 70 and the piston 20.

Similarly, at the high speed, the engine control unit 100 checks that the exhaust valve control signal will be sent to the exhaust valve actuator 72 to move the exhaust valve 70 toward the closed position prior to the exhaust valve 70 reaching the point 108. If the exhaust valve control signal which closes the exhaust valve 70 is not scheduled to be sent to the exhaust valve actuator 72 prior to the exhaust valve 70 reaching the point 108, the engine control unit 100 determines that the future valve position of the exhaust valve 70 interferes with the future piston position of the piston 20. The engine control unit 100 sends an override exhaust valve control signal via the signal line 80 to the exhaust valve actuator 72 which causes the exhaust valve actuator 72 to move the exhaust valve 70 toward the closed position thereby preventing the interference between the exhaust valve 70 and the piston 20.

Interference between the intake valve 50 and the piston 20 is also most likely to occur during the first potential interference period because the intake valve 50 is moved from the closed position to the open position during while the piston is near its uppermost position in the piston cylinder 16. It should be appreciated that the engine control unit 100 calculates the position and speed of the intake valve 50 based on the intake valve control signal, temperature signal, and pressure signal.

The line 110L represents the calculated position of the intake valve 50 necessary to avoid interference with the piston 20 when the engine is operating at the exemplary low speed whereas the line 110H represents the calculated position of the intake valve 50 necessary to avoid interference with the piston 20 when the engine is operating at the exemplary high speed.

It should be appreciated that to avoid interference between the intake valve 50 and the piston 20 at the low speed, the intake valve actuator 52 must start to open the intake valve 50 after the intake valve 50 reaches a point 112. The intake valve 50 must be opened later at lower speeds because the piston 20 is slowly moving away from the intake valve 50. On the other hand, to avoid interference between the intake valve 50 and the piston 20 at the high speed, the intake valve actuator 52 may start to move the intake valve 50 toward the open position after the intake valve 50 reaches the point 114. The intake valve 50 may be opened earlier at the high speed because the piston 20 is rapidly moving away from the intake valve 50. Therefore, the future piston position of the piston 20, and the future valve position of the intake valve 50 must be calculated prior to the intake valve 50 reaching the point 112 at the low speed and prior to the intake valve 50 reaching the point 114 at the high speed.

The engine control unit 100 then compares the future valve position of the intake valve 50 to the future piston position of the piston 20 to determine if the future valve position interferes with the future piston position. In particular, at the low speed, the engine control unit 100 calculates when the intake valve control signal will be sent to the intake valve actuator 52 to move the intake valve 50 toward the open position after the intake valve 50 reaches the point 112. If the intake valve control signal which opens the intake valve 50 is scheduled to be sent to the intake valve actuator 52 prior to the intake valve 50 reaching point 112, the engine control unit 100 determines that the future valve position of the intake valve 50 interferes with the future piston position of the piston 20. The engine control unit 100 then sends an intake valve override control signal via the signal line 60 which causes the intake valve actuator 52 to move the intake valve 50 toward the closed position thereby preventing the interference between the intake valve 50 and the piston 20.

Similarly, at the high speed, the engine control unit 100 checks that the intake valve control signal will be sent to the intake valve actuator 52 to move the intake valve 50 toward the open position prior to the intake valve 50 reaching the point 114. If the intake valve control signal which opens the intake valve 50 is scheduled to be sent to the intake valve actuator 52 prior to the intake valve 50 reaching the point 114, the engine control unit 100 determines that the future valve position of the intake valve 50 interferes with the future piston position of the piston 20. The engine control unit 100 then sends an override intake valve control signal via the signal line 60 to the intake valve actuator 52 which causes the intake valve actuator 52 to move the intake valve 50 toward the closed position thereby preventing the interference between the intake valve 50 and the piston 20.

Interference between the exhaust valve 70 or the intake valve 50 and the piston 20 are less likely to occur during the second potential interference period (not shown) because the exhaust valve 70 and the intake valve 50 are both positioned in the closed position during the second potential interference period. However, malfunctions or electrical interference could cause the exhaust valve 70 or the intake valve 50 to be positioned in the open position prior to the second potential interference period. Additionally, malfunctions or electrical interference could cause the exhaust valve 70 or the intake valve 50 to move from the closed position to the open position during the second potential interference period.

If the engine control unit 100 determines that either the exhaust valve 70 or the intake valve 50 was positioned in the open position prior to the second potential interference period, then the engine control unit 100 would use a method similar to that used to close the exhaust valve 70 prior to the first potential interference period as described above. Alternately, if the engine control unit 100 determines that either the exhaust valve 70 or the intake valve 50 was moving from the closed position to the open position during the second potential interference period, then the engine control unit 100 would use a method similar to that used to close the intake valve 50 during the first potential interference period as described above.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A method of operating an engine having (i) an engine block with a piston cylinder defined therein, (ii) an engine head secured to the engine block, (iii) a piston which translates within the piston cylinder wherein the engine block, the engine head, and the piston cooperate to define a combustion chamber, (iv) a crankshaft mechanically coupled to the piston, (v) a conduit in fluid communication with the combustion chamber, and (vi) an engine valve which is movable between an open position which places the combustion chamber in fluid communication with the conduit and a closed position which isolates the combustion chamber from fluid communication with the conduit, comprising the steps of:

sensing position of the crankshaft during a number of engine cycles and generating a crankshaft frequency signal in response thereto;

calculating a crankshaft speed and a crankshaft acceleration based on said frequency signal;

calculating a future piston position based on the crankshaft speed and the crankshaft acceleration;

calculating a future engine valve position;

comparing the future piston position to the future engine valve position to determine if the future engine valve position interferes with the future piston position; and locating the engine valve in the closed position in response to determining that the future engine valve position interferes with the future piston position.

2. The method of claim 1, wherein:

the engine further includes a hydro-electric actuator which is mechanically coupled to the engine valve, and the locating step includes the step of operating the hydro-electric actuator to position the engine valve in the closed position in response to determining that the future engine valve position interferes with the future piston position.

3. The method of claim 2, wherein:

the engine further includes a pressure sensor which measures hydraulic pressure supplied to the hydro-electric actuator, and the future engine valve position calculating step includes the steps of (i) measuring the hydraulic pressure with the pressure sensor and generating a pressure signal in response thereto, and (ii) modifying the future engine valve position based on the pressure signal.

4. The method of claim 2, wherein:

the engine further includes a temperature sensor which measures temperature of hydraulic fluid supplied to the hydro-electric actuator, and the future engine valve position calculating step includes the steps of (i) measuring the temperature of the hydraulic fluid with the temperature sensor and generating a temperature signal in response thereto, and (ii) modifying the future engine valve position based on the temperature signal.

5. The method of claim 1, wherein:

the engine further includes an intake manifold, the conduit is in fluid communication with the intake manifold, and the locating step includes the step of maintaining the engine valve in the closed position during an initial portion of an intake stroke in response to determining that the future engine valve position interferes with the future piston position.

6. The method of claim 1, wherein:

the engine further includes an exhaust manifold, the conduit is in fluid communication with the exhaust manifold, and the locating step includes the step of moving the engine valve to the closed position during a terminal portion of an exhaust stroke in response to determining that the future engine valve position interferes with the future piston position.

7. An engine assembly, comprising:

an engine block having a piston cylinder defined therein;

an engine head secured to said engine block;

a piston which translates within said piston cylinder, wherein said engine block, said engine head, and said piston cooperate to define a combustion chamber;

a crankshaft mechanically coupled to said piston;

a conduit in fluid communication with said combustion chamber;

an engine valve which is movable between an open position which places said combustion chamber in fluid communication with said conduit and a closed position which isolates said combustion chamber from fluid communication with said conduit;

a crankshaft sensor for sensing position of said crankshaft and generating a frequency signal in response thereto; and an engine control unit which is operable to (i) calculate a crankshaft speed and a crankshaft acceleration based on said frequency signal (ii) calculate a future piston position based on said crankshaft speed and said crankshaft acceleration, (iii) calculate a future engine valve position, (iv) compare said future piston position to said future engine valve position to determine if said future valve position interferes with said future piston position, and (v) cause said engine valve to be located in said closed position in response to determining that said future engine valve position interferes with said future piston position.

8. The engine assembly of claim 7, further comprising a hydro-electric actuator which is mechanically coupled to said engine valve, wherein:

said engine control unit is operable to cause said hydro-electric actuator to position said engine valve in said closed position in response to determining that said future engine valve position interferes with said future piston position.

9. The engine assembly of claim 8, further comprising a pressure sensor which measure hydraulic pressure supplied to said hydro-electric actuator, wherein:

said pressure sensor measures said hydraulic pressure and generates a pressure signal in response thereto, and said engine control unit modifies said future engine valve position based on said pressure signal.

10. The method of claim 8, further comprising a temperature sensor which measures temperature of hydraulic fluid supplied to said hydro-electric actuator, wherein:

said temperature sensor measures said temperature of said hydraulic fluid and generates a temperature signal in response thereto, and said engine control unit modifies said future engine valve position based on said temperature signal.

11. The engine assembly of claim 7, further comprising an intake manifold, wherein:

said conduit is in fluid communication with said intake manifold, and said engine control unit causes said engine valve to be maintained in said closed position during an initial portion of an intake stroke in response to determining that said future engine valve position interferes with said future piston position.

12. The engine assembly of claim 7, further comprising an exhaust manifold, wherein:

said conduit is in fluid communication with said exhaust manifold, and said engine control unit causes said engine valve to move to said closed position during a terminal portion of an exhaust stroke in response to determining that said future valve position interferes with said future piston position.

13. A method of operating an engine having a crankshaft, a piston, an engine valve, a combustion chamber, and a conduit, wherein (i) the engine valve is movable between an open position and a closed position, (ii) the engine valve allows fluid communication between the combustion chamber and the conduit when the engine valve is positioned in the open position, and (iii) the engine valve prevents fluid communication between the combustion chamber and the conduit when the engine valve is positioned in the closed position, comprising the steps of:

calculating a future piston position of the piston;

calculating a future engine valve position of the engine valve;

comparing the future piston position to the future engine valve position to determine if the future engine valve position interferes with the future piston position; and moving the engine valve toward the closed position in response to determining that the future engine valve position interferes with the future piston position.

14. The method of claim 13, further comprising the step of sensing position of the crankshaft during a number of engine cycles and generating a frequency signal in response thereto and calculating a crankshaft speed based on said frequency signal, wherein:

the future piston position calculating step includes the step of calculating the future piston position based on the crankshaft speed.

15. The method of claim 14, further comprising the step of calculating a crankshaft acceleration based on said frequency signal, wherein:

the future piston position calculating step includes the step of calculating the future piston position further based on the crankshaft acceleration.

16. The method of claim 13, wherein:

the engine further includes a hydro-electric actuator which is mechanically coupled to the engine valve, and the moving step includes the step of operating the hydro-electric actuator to move the engine valve toward the closed position in response to determining that the future engine valve position interferes with the future piston position.

17. The method of claim 16, wherein:

the engine further includes a pressure sensor which measures hydraulic pressure supplied to the hydro-electric actuator, and the future engine valve position calculating step includes the steps of (i) measuring the hydraulic pressure with the pressure sensor and generating a pressure signal in response thereto, and (ii) modifying the future engine valve position based on the pressure signal.

18. The method of claim 16, wherein:

the engine further includes a temperature sensor which measures temperature of hydraulic fluid supplied to the hydro-electric actuator, and the future engine valve position calculating step includes the steps of (i) measuring the temperature of the hydraulic fluid with the temperature sensor and generating a temperature signal in response thereto, and (ii) modifying the future engine valve position based on the temperature signal.

19. The method of claim 13, wherein:

the engine assembly further includes an intake manifold, the conduit is in fluid communication with the intake manifold, and the moving step includes the step of maintaining the engine valve in the closed position during an initial portion of an intake stroke in response to determining that the future engine valve position interferes with the future piston position.

20. The method of claim 14, wherein:

the engine assembly further includes an exhaust manifold, the conduit is in fluid communication with the exhaust manifold, and the moving step includes the step of moving the engine valve toward the closed position during a terminal portion of an exhaust stroke in response to determining that the future engine valve position interferes with the future piston position.

* * * * *